United States Patent [19]

Delanoy

[11] Patent Number: 5,793,888
[45] Date of Patent: Aug. 11, 1998

[54] MACHINE LEARNING APPARATUS AND METHOD FOR IMAGE SEARCHING

[75] Inventor: Richard L. Delanoy, Stow, Mass.

[73] Assignee: Massachusetts Institute of Technology, Cambridge, Mass.

[21] Appl. No.: 790,178

[22] Filed: Jan. 29, 1997

Related U.S. Application Data

[63] Continuation of Ser. No. 339,500, Nov. 14, 1994, abandoned.

[51] Int. Cl.$^6$ .................................. G06K 9/00; G06K 9/68
[52] U.S. Cl. ........................... 382/219; 382/155; 382/170
[58] Field of Search ........................ 382/305, 209, 382/155, 215, 216, 219, 222, 170, 168, 141, 217; 364/419.19

[56] References Cited

U.S. PATENT DOCUMENTS

| | | | |
|---|---|---|---|
| 4,075,604 | 2/1978 | Degasperi | 382/170 |
| 5,222,155 | 6/1993 | Delanoy et al. | 382/215 |
| 5,432,902 | 7/1995 | Matsumoto | 395/156 |
| 5,638,460 | 6/1997 | Nishimori et al. | 382/141 |

FOREIGN PATENT DOCUMENTS

| | | | |
|---|---|---|---|
| 504577 | 9/1992 | European Pat. Off. | 382/209 |

OTHER PUBLICATIONS

Delanoy et al., Machine Learining for a Toolkit for Image Mining, 1-16.

Niblack, et al., "The QBIC Project : Querying Images by Content Using Color, Texture and Shape," *Computer Science*, (1993, Feb.).

"An Introduction to Multispec", developed by landgrebe and Biehl at Purdue University, School of Electrical Engineering (1995, Feb. 15). (This version was the only version available and the differences from the 1994 version are noted in Appendix C.).

Turk, et al., "Eigenfaces for Recognition, " *Journal of Cognitive Neuroscience*, 3(1):71-86 (1991).

Huber, H. P., and Casler, K. E., "Initial Analysis of Landsat TM Data for Elk Habitat Mapping," *Int. J. Remote Sensing*, 11(5):907-912 (1990).

Augusteijn, M., et al., "Performance Evaluation of Texture Measurements for Ground Cover Identification in Satellite Images by Means of a Neutral Network Classifier, " *Technical Report EAS-CS-93-8*, University of Colorado (1993, Oct.).

Delanoy et al., "Functional Templates and Their Application to 3-D Object Recognition," *Proceeding of the 1992 International Conference of Acoustics, Speech, and Signal Processing*, San Francisco, Ca (Mar. 23-26, 1992).

Delanoy et al., "Machine Intelligent Gust Front Detection, " *The Lincoln Laboratory J.*, 6(1):187-212 (1993).

(List continued on next page.)

*Primary Examiner*—Joseph Mancuso
*Assistant Examiner*—Timothy M. Johnson
*Attorney, Agent, or Firm*—Hamilton, Brook, Smith & Reynolds, P.C.

[57] ABSTRACT

A computer module is interactively trained to recognize patterns of spectral or textural features in imagery. The interactively trained module is based on techniques of knowledge-based image processing and an approach that uses interest images to provide a means of continuous feedback of module performance to the user. The user, in turn, responds by indicating where the module is making mistakes. A set of user indicated examples and counter examples form the inputs to a machine learning program called Functional Template Learning. The trained module is exportable as an independent agent to search large databases for matching patterns. Following retrieval of images having matching patterns, a user can further refine the agent's performance by indicating where mistakes have been made. The overall search tool employing the trained module is capable of prescreening and highlighting images, significantly reducing the workload of analysts attempting to detect regions or objects in imagery.

6 Claims, 7 Drawing Sheets

OTHER PUBLICATIONS

Delanoy et al., "Machine Intelligent Automatic Recognition of Critical Mobile Targets in Laser Radar Imagery," *The Lincoln Laboratory J.*, 6(1):161–186 (1993).

Donald F. Specht, "Probabilistic Neural Networks," *Neural Networks*, 3:109–118 (1990).

Musavi et al., "On The Training of Radial Basis Function Classifiers," *Neural Networks*, 5:595–603 (1992).

Carpenter et al., "Fuzzy ART: Fast Stable Learning and Categorization of Analog Patterns by an Adaptive Resonance System," *Neural Networks*, 4:759–771 (1991).

Letter Soliciting Sponsors, Sep. 19 and 28, 1994 with unpublished enclosure by Delanoy et al., "Machine Learning for a Toolkit for Image Mining" *Lincoln Laboratory, Massachusetts Institute of Technology*, p. 1–16.

MACHINE LEARNING APPARATUS AND METHOD FOR IMAGE SEARCHING

This application is a continuation of application Ser. No. 08/339,500 filed on Nov. 14, 1994, now abandoned which is incorporated herein by reference in its entirety.

GOVERNMENT SUPPORT

The following was supported by U.S. Air Force Program 1, Contract No. F19628-90C-002. The U.S. Government has certain rights in the invention.

RELATED APPLICATIONS AND PUBLICATIONS

Similar subject matter to that of the present invention is found in the following publications:

U.S. Pat. No. 5,222,155 issued Jun. 22, 1993 to the Assignee of the present invention.

R. L. Delanoy, et al. "Functional Templates and their Application to 3-D object Recognition," *In Proc. of the Intl. Conf. on Acoustics, Speech, and Signal Processing*, San Francisco, Calif., March, 1992.

BACKGROUND OF THE INVENTION

There is a growing problem in that the vast image databases being accumulated today are overwhelming the capabilities of users to find particular images. For example, much of the data currently obtained from military and civilian sensors is recorded and never accessed because of the difficulty of searches. And the problem is rapidly getting worse: NASA's planned Earth Observing Satellites (EOS) will generate a hundred times the number of images that are currently stored from all remote sensor platforms, more data than is presently stored in the Library of Congress. How this data can be made available to researchers with varying levels of computer expertise and hardware capability is the subject of a continuing national debate.

The problem is not just one that NASA has to face. The military and intelligence communities, medical science, the entertainment industry, the National Oceanic and Atmospheric Administration (NOAA), and law enforcement are all collecting image data at increasingly rapid rates as sensor and mass storage devices become more capable and less expensive. The military and intelligence communities in particular employ small armies of analysts to scan image data collected by satellite and airborne sensor platforms. And yet, even in high priority situations, the many analysts cannot screen in a timely fashion all of the data collected.

Computer assistance will become increasingly necessary to facilitate such searches. Metadata (key words and computed indices used to label each image as a whole), can be used to locate images for some applications. For example, one might ask for Landsat images collected in Florida during June of 1993. While very useful, metadata is insufficient and impractical for many search problems, such as finding images of moving targets in military applications, prospecting for minerals in Earth satellite data, finding tropical storms in weather satellite images, or attempting to find a face in images generated by an airport surveillance camera. For these and many other applications, the only solution is to search the image contents directly. Note that content-based search and retrieval of images is very different than that for textual libraries. Content-based retrieval of text is done using collections of keywords, which are part of a finite language. In contrast, image features are near infinite in variety, with no pre-existing dictionary and without basis in language or syntax.

The available means for searching through image data on the basis of content are generally primitive. The most primitive are customized algorithms, designed to search for some particular signature. While these are often effective, such algorithms are expensive to create and maintain, are suitable for only a very limited problem, and their construction and maintenance requires someone with expertise in computer vision and image processing.

An active area of recent research and product development has been to build generalized database retrieval or classification tools with user-friendly environments that non-experts in computer vision could use. Currently, these tools generally allow the user to provide only a single example, be it a drawn shape or a subimage. The algorithm will then attempt to characterize the example in some way (e.g., edges, spectral statistics, eigenvalues) and compare these characteristics with those computed for other images or subimages. Differences between example and archive image characteristics are assimilated into a single "distance" calculation, which is then used as the criterion for selection. While capable of attention-getting demonstrations, these tools have exhibited only poor to fair performance and have only been applied to small databases in limited domains. Examples of this class of search and classification tools are QBIC, developed by Niblack et al. at IBM (See "The QBIC Project: Querying Images by Content Using Color, Texture and Shape" by Niblack et al., *Computer Sciences*, February 1993), and MultiSpec, developed by Landgrebe and Biehl at Purdue University. (See "An Introduction to Multispec", School of Electrical Engineering, Purdue University, Feb. 15, 1994 edition).

The principal failing of this kind of approach is that the user is allowed to present only a single example. As a result, there is no way for the user to know how discriminating the constructed search tool is and to provide feedback to indicate where the algorithm has generated mistakes. There is no way for the search tool to improve with "experience". Finally, some computed characteristics of an image feature may be inconsistent over multiple images. There is no way for the search tool to discover which characteristics are reliable discriminators. In short, with this approach there is some chance that a user might get good discrimination/classification performance with a single example. But when the user is not getting the desired results, there is no way to make the search tool any better.

Another approach to database search and retrieval is one developed by Alex Pentland at MIT. (See Turk et al., "Eigenfaces for Recognition", *Journal of Cognitive Neuroscience*, 3(1):71–86, 1991). Briefly, their approach allows the assimilation of example faces into models of facial features called eigenfaces. Each face in the database is characterized in terms of differences from these eigenfaces. In order to recognize a new face, these characterizations are computed and compared with those of faces stored in the database. While eigenfaces is a promising approach to a very hard problem, it still does not promote learning from mistakes or allow users to shape and reshape classification performance to their expectations.

SUMMARY OF THE INVENTION

The present invention provides a machine learning image searching apparatus and method which obviates the foregoing problems. As to one object of the present invention, the image searching apparatus provides processor means that determines most discriminating attributes from user input examples and/or counter-examples to search for a desired image out of a collection of images. In another object of the present invention, dual histograms are employed to generate scoring functions for a functional template matching routine which selects desired images from the collection of images based on match scores.

In a particular embodiment, computer image searching apparatus of the present invention includes:

input means for setting forth a user-desired image subject having various attributes;

processor means coupled to the input means for determining from the various attributes, a subset of most discriminating attributes;

a functional template member coupled to the processor means for providing a functional template based on scoring functions for each discriminating attribute; and     an agent which receives the functional template from the functional template member. The agent employs the functional template in a matching routine to extract user desired images from a multiplicity of images.

The multiplicity of images being searched may be a real-time stream of images or images stored in a database.

Further the processor means in a preferred embodiment includes:

a histogram member coupled to the input means for generating a histogram for each attribute;

processing means coupled to the histogram member for generating weights and scoring functions of the attributes; and     a sorter for selecting scoring functions according to highest weight. The attributes corresponding to the selected scoring functions form the subset of most discriminating attributes.

In addition, the histogram member preferably generates a pair of histograms for each attribute. The pair of histograms includes a first histogram based on user input examples of the attribute, and a second histogram based on user input counter-examples of the attribute. In turn, for each attribute, the processing means generates a weight and a scoring function from the pair of histograms generated for the attribute. In particular, for each attribute, the processing means calculates the weight as a function of degree of overlap between the first and second histograms in the pair of histograms for the attribute.

In the preferred embodiment, the processing means and sorter are coupled such that the processing means generates weights for each attribute. In response, the sorter selects attributes with the highest weights, and the processing means then generates scoring functions for the selected (highest weighted) attributes.

In accordance with another feature of the present invention, the histogram member employs a data diffusion or generalization routine in the case of sparse data, to generate the histogram for an attribute.

In accordance with another aspect of the present invention, the scoring functions generated by the processing means may be formed from a multiplicity of attribute values. That is, derivatives of the discriminating attributes and combinations thereof may be used to form working attributes from which other weights and scoring functions are created.

In addition, the functional templates based on the scoring functions for the discriminating attributes may include scoring functions that look at the relationship between/among attribute values instead of single attribute values.

In accordance with another aspect of the present invention, the agent further receives user defined selection criteria and/or rules for retrieving images from the multiplicity of images. The matching routine employed by the agent produces match scores of images in the multiplicity of images. In response, the agent applies the user defined selection criteria/rules to the match scores and retrieves the images with corresponding match scores that meet the selection criteria.

The present invention image searching apparatus and method obtains images containing user desired image subjects such as an object, geographical area, geometrical shape or a subimage.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Using tools of knowledge-based signal processing developed at Lincoln Laboratory, applicant has designed and implemented a new approach to computer learning, which is the core technology of the present invention image searching apparatus and method. The user and computer image searching apparatus of the present invention maintain a 2-way dialogue allowing the user to supervise the learning of search tools in a manner analogous to classical conditioning. Learning exhibits rapid-convergence to reasonable performance and, when thoroughly trained, these search tools appear to be competitive in discrimination accuracy with other classification techniques, such as neural networks and Bayesian classifiers. The learned search tools are simple in structure, are self-contained, and can be exported as independent agents to peruse large databases. Moreover, because the search tools are highly modular, it is possible to link multiple search tools to produce even more complex functionality.

Figure 7:
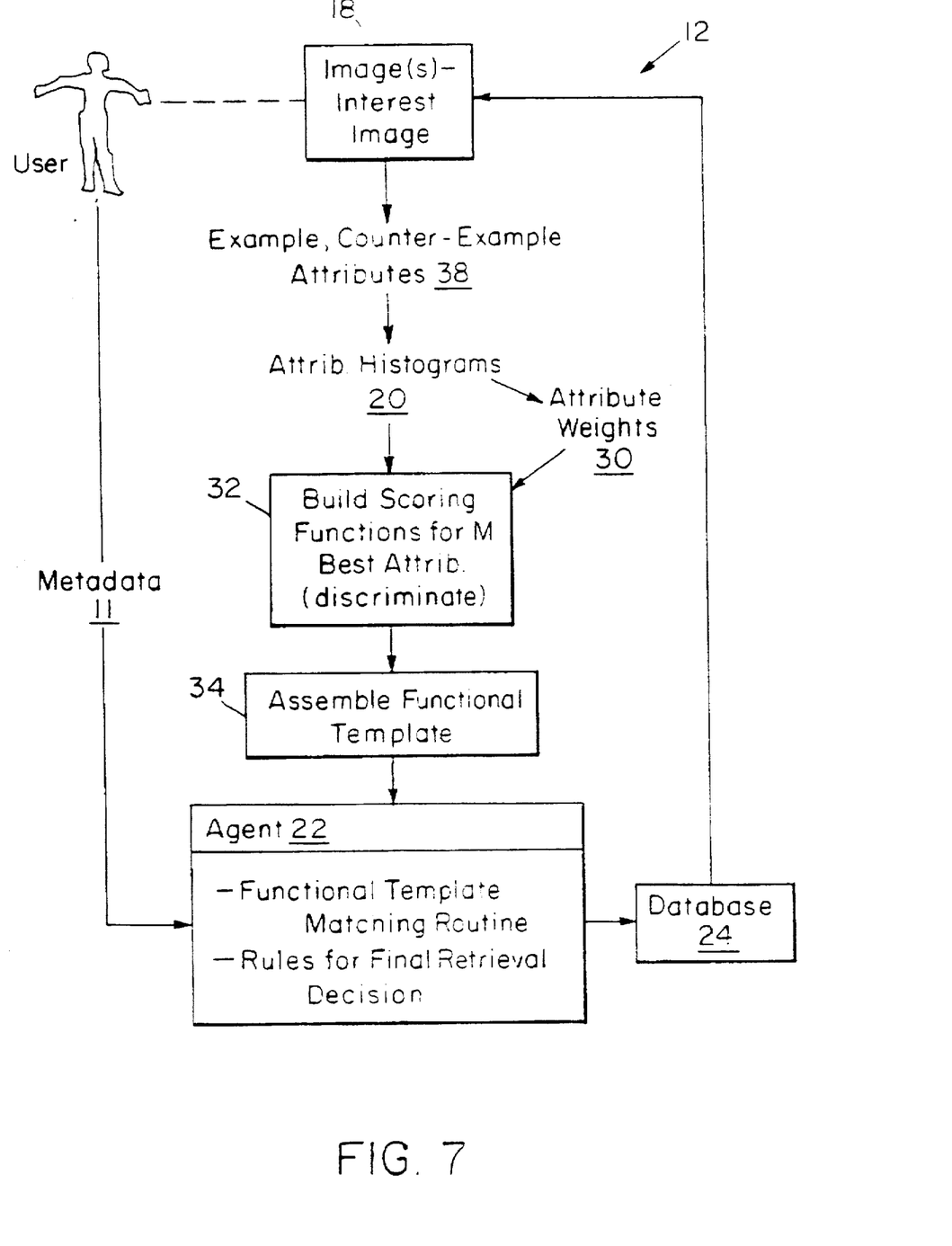
FIG. 7 is a flow diagram of the preferred embodiment of the present invention.

The premise of the present invention is that a user, having one image containing some subject, object or region, or subimage would like to find other such images in a large database. The task is accomplished by a search tool, called an agent, that is taught by the user as to what attributes of the subject are discriminating. The teaching is done in a supervised learning session in which the user and agent (more accurately, supporting program 12) continuously provide feedback to each other as illustrated in FIG. 7.

In the first step, the user inputs information about the data and the nature of the object or region to be sought. This may include metadata 11, specifying the name of the sensor, and the locations and times of interest. This metadata 11 provides an initial constraint on any searches, reducing the number of images that are actually scanned by the agent. Individual images to be used for training would be specified here as well. Other input screens/menus provide options for what attributes the supporting program 12 is to consider. For example, if the data source is multispectral, then the value of each spectral band and the value of each ratio of bands might be the considered set of attributes. Various texture and shape analysis techniques may optionally be considered as candidate attributes.

Figure 1:
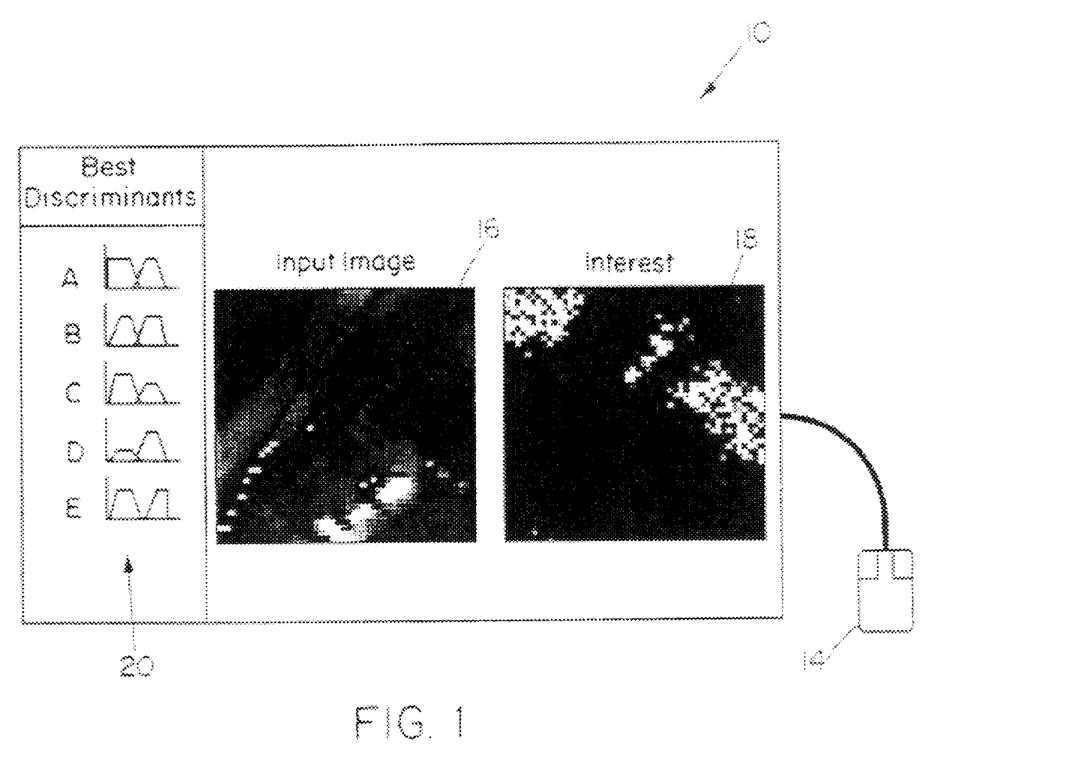
FIG. 1 is an illustration of the main user/machine interface screen in which the user inputs example and counter example attributes of desired image.

Following initialization, the main user/machine interface is a screen 10 that looks something like FIG. 1. In it is presented one or more input images 16 (center) and an interest image 18 (right). With the mouse 14 the user indicates pixels (or pixel level results) that are examples of the feature to be sought or that are counter-examples of other features to be ignored. These are represented as blue (example) and yellow (counter-example) pixels overlaid on one of the input images. Histograms 20 of example and counter-example attribute values (shown on the left) are constructed. Preferably, for each attribute (A through E illustrated), a pair of histograms, one from user-input examples of the attribute and one from user input counter examples, is considered as discussed in detail later. Those with the least overlap within a pair are determined to be the best discriminants (such as attributes D and E illustrated in FIG. 1).

An agent 22 is then constructed by exploiting the ranges of attribute values with the least overlap between examples and counter-examples. The agent 22 in turn generates an image in which high interest is assigned to locations/portions that are similar to the set of examples and low interest everywhere else. The user then scans the interest image 18, looking for mismatches between the agent's output and his/her expectations. Some pixel location that should have been given a high interest value, but was not, is added by the user to the set of examples. Or, some location that was inappropriately given a high interest value is added to the set of counter-examples. With each new input, the supporting program 12 revises the "model" of user intentions, produces a new interest image 18, and the process repeats until the user is satisfied with the agent's performance. The foregoing describes the supervised learning or machine learning which is key to the present invention.

Once satisfied with the agent's performance on a single input image 16, the user must select some criterion for image retrieval. For example, the user might request that the agent 22 retrieve any image for which the average interest value is greater than some threshold t. Or, perhaps the agent 22 should retrieve any image in which the number of interest values greater than t is more than 10% the total number of pixels in the image.

The agent 22 is then ready to embark on a search of a collection 24 of images such as a database or a real-time image stream and the like. While it may certainly be used to search a database resident on the training workstation, a main goal is to create an agent 22 that can enter a supercomputer serving a large database, for example one of the Data Archive and Analysis Centers (DAACs) that NASA has established as part of the Earth Observing Satellite Data and Information System (EOSDIS). One simple method involves the agent code and parameters to be e-mailed to the DAAC host, which would know by some prearranged code that it should compile, load, and start the agent 22. Metadata 11 collected during agent initialization is used to constrain the search. Time limits may be used to protect both the user and the user community from runaway, forgotten, or poorly learned agents 22. The agent 22 may be configured to either search through archived data or perhaps monitor the stream of recently processed images on their way to archival storage.

The user next explores the retrieved input and computed interest images to both assess the performance of the agent 22 and to look for interesting object or region variants found by the agent 22. At this point, the user has the option of re-entering the learning environment to further refine the agent 22.

The interest image 18 also provides a limited means for quantitative analysis. Scientists or policy makers, interested in spatial measurements or in trend analysis, would be able to quantify the extent of high interest regions with various statistical characterizations and perhaps look for changes over time.

The core technology of the present invention is a new machine learning algorithm or process, based on techniques of knowledge-based image processing developed at Lincoln Laboratory. More traditional approaches to machine learning, such as neural networks, may alternatively be used. However, as will be described later, the new approach has several advantages over other machine learning approaches and is particularly well suited to the present invention image searching environment.

Techniques of knowledge-based image processing have been developed at Lincoln Laboratory in the context of automatic target recognition. (See Delanoy et al., "Machine Intelligent Automatic Recognition of Critical Mobile Targets in Laser Radar Imagery," *Lincoln Laboratory Journal*, 6(1) :161–186, Spring 1993). These techniques have been successfully extended to other areas, including the automatic detection of hazardous weather in Doppler radar images. Several weather detection-algorithms constructed by means of this approach are being operationally tested at several airports across the country. These new algorithms have consistently demonstrated capabilities that are much improved over the prior state of the art. Knowledge-based image processing is based on two particular tools: interest images and functional template correlation.

An interest image is a spatial map of evidence for the presence of some feature. To be useful in the context of a search, that feature should be selectively indicative of some region or object that is being sought. Pixel values range from [0,1], with higher pixel values reflecting greater confidence that an intended feature is present at that location. Interest is particularly effective as a "common denominator" for data fusion. Input data from a variety of sensor sources can each be transformed into one or more interest images highlighting some set of features thought to be indicative of a target. With simple or arbitrarily complex rules of arithmetic, fuzzy logic, or statistics, these individual interest images can be assimilated into a single combined interest image. Knowledge of circumstances under which each interest image is a good discriminant can be used to guide the weighting of each individual interest image during fusion. Ultimately, a detection algorithm with very complex properties can be assembled from a set of simple feature detectors, each of which generate an interest image. In addition to their role in data fusion, interest images provide a means of representing information for human interpretation. The highlighting of features as interest serves as a means of cuing human attention to a particular feature that would be difficult to spot in raw image data.

Functional template correlation(FTC) is a generalized matched filter used to create customized, knowledge-based image processing operations. FTC, originally developed as a means of computing interest images, incorporates aspects of fuzzy set theory to transform raw data into maps of match scores in the range [0,1]. FTC can most easily be understood as a simple extension of auto-correlation. Given some input image I, an output image O is generated in auto-correlation by matching a kernel K (essentially a small image of image values) at each pixel location $I_{xy}$. Each element of K is a literal image value expected to be present for a good match. When K is tested at each pixel location $I_{xy}$, elements of K overlay pixels in the local neighborhood of $I_{xy}$. Each element of K and the corresponding, superimposed pixel value are multiplied together. The sum of these products is the match score placed in $O_{xy}$. If the shape to be matched can vary in orientation, then the pixel $I_{xy}$ is probed by kernel K at multiple orientations. The score assigned to $O_{xy}$ is the maximum across all orientations.

FTC is fundamentally the same operation with one important exception: Where the kernel of autocorrelation consists of literal image values (essentially a subimage of the image to be probed) the kernel used in FTC is a set of indices, each referencing a scoring function. These scoring functions encode a mapping between input image values and scores to be returned. High scores are returned whenever the input image value falls within the fuzzy limits of expected values. Low scores are returned whenever the input value falls outside these limits. The set of scores returned for each element of the kernel K are averaged and clipped to the continuous range [0,1]. A functional template, then is a kernel of indices and their associated scoring functions. As in autocorrelation, if the feature being sought can vary in orientation, then the match score is the maximum average score computed across multiple orientations of the kernel.

Figure 2:
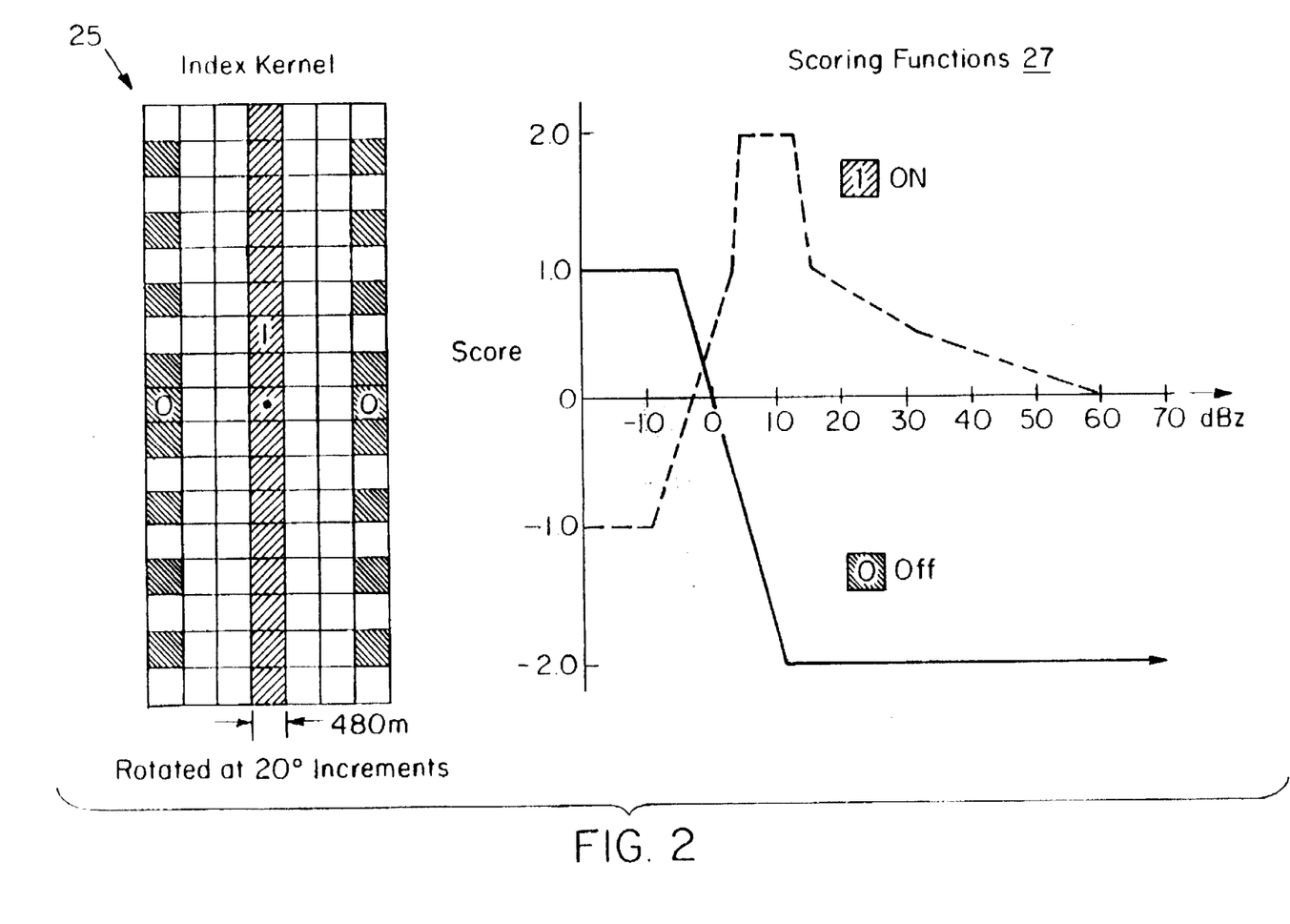
FIG. 2 is a schematic diagram of a functional template for an exemplified thin line detector.

As an example, consider the functional template shown in FIG. 2 designed to detect gust fronts in radar reflectivity data. Gust fronts are observed as thin lines of moderate reflectivity (approximately 0 to 20 dBZ), that are flanked on both sides by low reflectivity values (approximately −10 to 0 dBZ). On the left is the template kernel 25 consisting of integers, corresponding to the two scoring functions 27 shown on the right. Elements of the kernel that do not have an index form guard regions in which image values are ignored and have no effect on match scores. Scoring function 0 (solid line), corresponding to the flanking regions of low reflectivity, returns a maximal score of 1.0 for image values in the interval of −20 dBZ to −5 dBZ, a gradually decreasing score for image values in the interval −5 dBZ to 10 dBZ, and a score of −2.0 for image values larger than 10 dBZ. Scoring function 1 (dashed line), corresponding to the center of the kernel where moderate reflectivity values are expected, returns maximal scores in the interval between 5 and 12.5 dBZ with gradually decreasing scores for both higher and lower image values.

In general, by increasing or decreasing the interval over which affirming scores (i.e., scores>0.5) are returned, scoring functions can encode varying degrees of uncertainty with regard to what image values are allowable. In addition, knowledge of how a feature or object appears in sensor imagery can be encoded in scoring functions. With various design strategies, the interfering effects of occlusion, distortion,noise,and clutter can be minimized. As a consequence, functional templates customized for specific applications are generally more robust than standard, generic signal processing operations. In the thin-line matched filter example shown in FIG. 2 and discussed above, the filter does not simply find thin lines, but can select those thin lines having reflectivity values within a particular range. FTC has been used as a direct, one-step means of detecting 3-D objects and can be used to implement fuzzy, knowledge-based versions of edge detection, thin line filtering, thin line smoothing, shape matching, skeletonizing of shapes, or shape erosion.

A means of data fusion has been implemented in FTC that allows multiple functional templates to probe input images in tandem, producing a single output interest image. This technique assumes that each input image is pixel-registered to the others and that the functional templates all share a common center of rotation. A match score for pixel $O_{xy}$ is computed as an average of the set of scores computed for all elements of all kernels. Each template or scoring function can be assigned a unique weight in the range [0,1], allowing knowledge of the reliability of each template or function to bias the average. If the target being sought can vary in orientation, then the kernels of all functional templates are rotated together in lock step.

In the present invention, in order to probe multispectral images, functional templates 34 are constructed for each spectral band. Each functional template 34 consists of a kernel having a single element, along with a single scoring function. Transformations of multiple bands into a single value,such as the ratio of two bands, might also be considered as inputs and likewise have a functional template 34. In addition, other transformations of the input data might use a window operation to compute for each pixel an index that is indicative of the spatial properties or texture in the neighborhood surrounding the pixel. Most useful are transformations that compute various attributes of texture. For example, local neighborhood variance can be computed for each pixel location in an image. Other transformations might include fractal dimension, contrast, periodicity, orientation, and parallelism. The functional templates 34 for each spectral band, spectral transformations, and textural transformations are all applied in tandem in the present invention, producing a single weighted average (i.e., interest value) for each pixel of the output interest image 18.

Given this structure for spectral and textural functional template correlation, functional template learning (at 34 in FIG. 7) is implemented by constructing scoring functions 32 and computing weights 30 from a set 38 of examples and counter-examples as shown in FIG. 7. The illustrated approach is based on the construction of distribution histograms 20, one for example and another for counter-example values of each attribute (spectral band or transformation). Next a weight 30 is computed for a functional template from a measure of the overall extent of overlap between the example and counter-example distributions. The weight 30 is 1.0 if there is no overlap between examples and counter-examples. The weight 30 is 0.0 when the distributions of examples and counter-examples are exactly the same. The scoring function 32 is a mapping constructed from a comparison of the extent of overlap at each input image value. For example, high scores are returned for input values that have many examples and few or no counter-examples. Similarly, low scores are returned for values that have many counter-examples and few or no examples. What follows is a more detailed description of how a single scoring function 32 and weight 30 is computed for an attribute in the preferred embodiment.

The mean and standard deviation of the set 38 of examples (not counter-examples) are computed for some attribute. These statistics are then used to scale image values to a range of 0 to 255, such that the mean value is mapped to 128, while 0 and 255 are mapped to the input values that are 3 standard deviations below and above the mean, respectively. Input values more than 3 standard deviations from the mean are clipped to 0 and 255. This scaling based on the example statistics is applied to all example and counter-example attribute values 38.

A histogram 20 is then constructed from the set of scaled example values. Each value is added to the histogram 20 by incrementing the count of the corresponding bin. For example, if the scaled value is 201, then the histogram value of bin 201 is incremented by 1. If the total number of examples is small, then some number of bins to either side are also incremented to approximate a fully populated distribution. The number of neighboring bins to be incremented is computed as follows:

$$\text{width} = INT\left(f\left(1.0 - \frac{n}{256}\right)\right)$$

where n is the number of example values, f is a user adjustable parameter (typically set to 8), and INT() is the truncation operator. A counter-example histogram 20 is likewise constructed from the set of scaled counter-example values.

Each functional template weight 30 is computed as follows:

$$\text{weight} = 2X\left(0.5 - \frac{\sum_{i=0}^{255} MIN(H_i^{ex}, H_i^{cex})}{\sum_{i=0}^{255}(H_i^{ex} + H_i^{cex})}\right)$$

where i is the bin number and $H^{ex}$ and $H^{cex}$ are the example and counter-example histograms 20. The attributes are ranked by weight in decreasing order. Scoring functions 32 are then constructed for the m highest weighted attributes, called the best discriminants as mentioned in FIG. 1. The parameter m is a user adjustable parameter.

Figure 3:
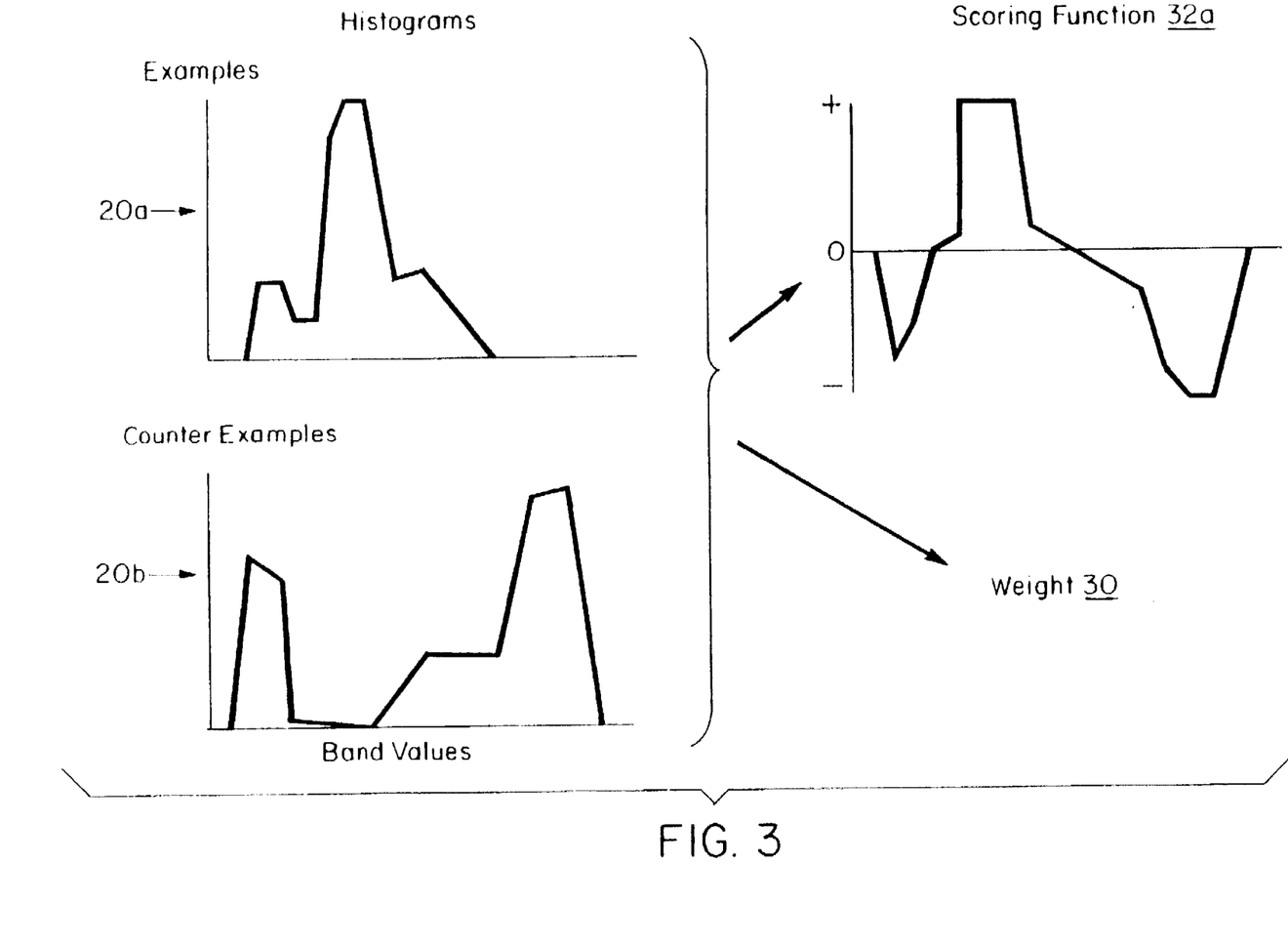
FIG. 3 is a schematic illustration of the construction of a scoring function and weight from example and counter example histograms of an attribute.

Scoring functions 32 are computed from a comparison of the corresponding example and counter-example histograms 20a,b as shown in FIG. 3. Each scoring function 32a is implemented as a lookup table of 256 scores, one for each possible scaled image value. The score $F_i$ to be returned for each input image value i is computed as follows:

$$F_i = \begin{cases} 0.0 & \text{if } H_i^{ex} = 0 \text{ and } H_i^{cex} = 0 \\ 16 \times R(H_i^{ex}, \Sigma_i = 0^{255} H_i^{ex}, 0.0, 0.5) & \text{if } H_i^{ex} = 0 \\ 16 \times R(H_i^{ex}, \Sigma_i = 0^{255} H_i^{ex}, 0.0, 0.5) & \text{if } H_i^{cex} = 0 \\ 16 \times R(H_i^{ex}, H_i^{cex}, 1.0, 40.0) & \text{if } H_i^{ex} > H_i^{cex} \\ 16 \times R(H_i^{cex}, H_i^{ex}, 1.0, 40.0) & \text{otherwise} \end{cases}$$

Where R(a,b,c,d) is the ramp function R(a,b,c,d)=

$$MIN\left(1.0, \frac{MAX\left(0.0, \frac{a}{b} - c\right)}{d - c}\right)$$

It is this set of scoring functions that define the functional template 34. See related U.S. Pat. No. 5,222,155 (herein incorporated by reference) for further details regarding construction and use of the functional template 34.

Examples and Evaluation

Figure 4:
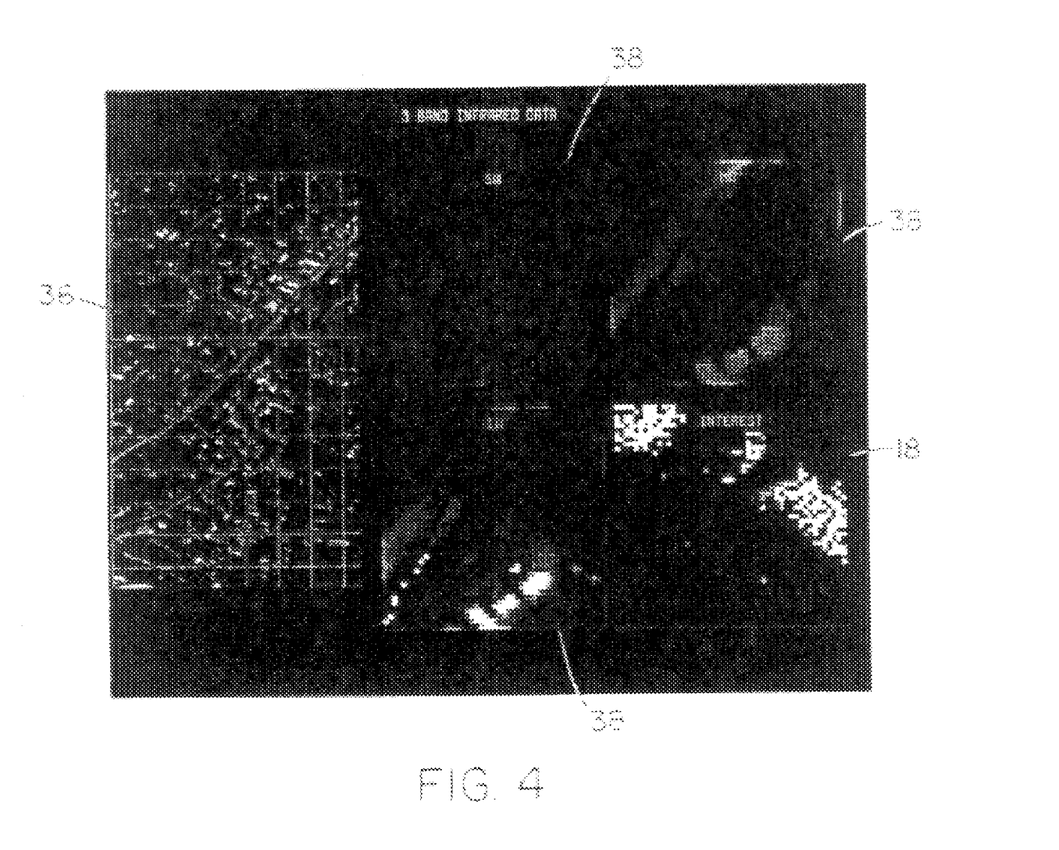
FIG. 4 is an illustration of an exemplified set of examples and counter examples and the resulting interest image.

Agent training and use are illustrated with two different examples. In the first, 3-band (long wave, medium wave, and short wave) infrared images of urban and suburban scenes were used. Images were divided into 50 by 50 pixel tiles. FIG. 4 shows one such image 36 of a town in Michigan and the 3 spectral bands of a tile (tile 40 in the full image) showing two bridges crossing a river. The user's intent is to create an agent 22 that will identify water. The blue and yellow pixels in the frame marked LW indicate the examples 38 and counter-examples 38 selected by the user for training. On the right is the interest image 18 produced by the agent 22, which is selectively highlighting the river.

Figure 5:
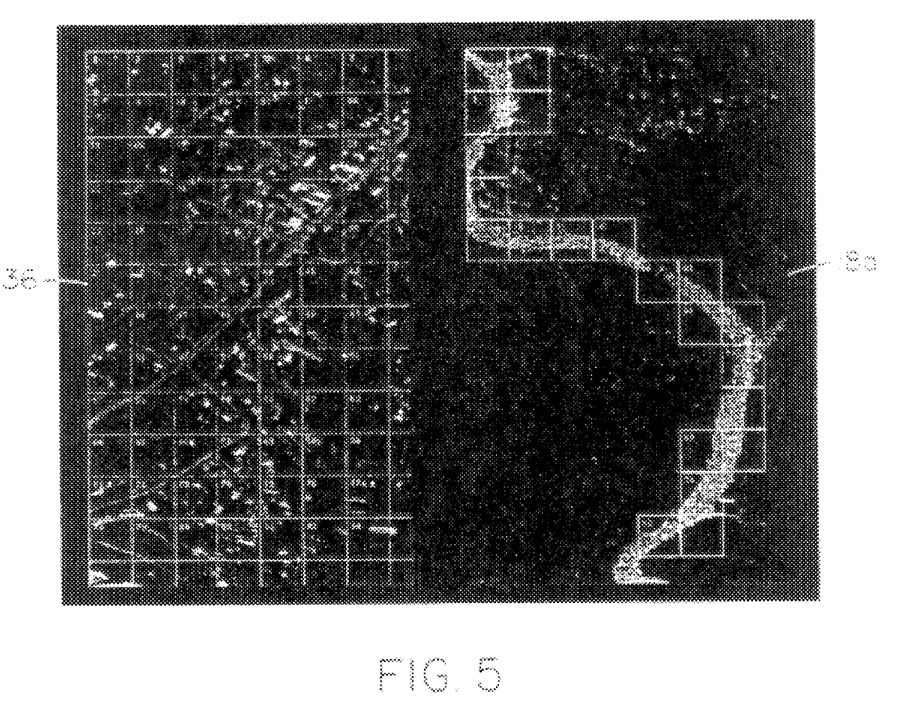
FIG. 5 is an illustration of the interest image and selected subimages resulting from application of the functional templates constructed in the FIG. 4 example.

In order to search through a database of images for more images of water, the agent 22 must be assigned some selection criterion. The selection criterion takes the form of a threshold applied to some statistic of interest values. One possible selection threshold would be to take those images that have average interest images 18 greater than 0.1. Another alternative would be to select images in which 10% or more of interest pixels have values above 0.5. FIG. 5 illustrates the selection process. On the left is the full size image 36 shown in FIG. 4. On the right is the interest image 18a generated by applying to the whole image 36 the agent 22 taught to recognize images of water. The yellow boxes enclose tiles that have average interest values of 0.06 (out of the range [0,1]) or higher. Applicant has demonstrated the search functionality by looking for high interest tiles within a large image. The same mechanism would apply to the task of looking for high interest images within a large database.

A more difficult task is the classification of vegetation types using Landsat Thematic Maper (TM) images. H. P. Huber and K. E. Casler in "Initial Analysis of Landsat TM Data for Elk Habitat Mapping," *Int. J. Remote Sensing*, 11(5):907–912, 1990, have described work in which they evaluated a variety of simple classification metrics and formulas developed by wildlife biologists. Their area of study, a region in central Colorado, was classified pixel-by-pixel into 14 vegetation types. Actual ground data were collected and used for scoring. They concluded that "using remote sensing information in complex terrains can be a difficult and relatively inaccurate process". With no technique did the percentage of correct classifications exceed 50% with high numbers of false alarms. When they also used digital elevation model data to determine the direction in which terrain was facing, they reached nearly 70% detection, although still with substantial numbers of false alarms.

Using the same TM data, M. Augusteijn et al. in "Performance Evaluation of Texture Measurements for Ground Cover Identification in Satellite Images by Means of a Neural Network Classifier," Technical Report EAS-CS-93-8, University of Colorado, Colorado Springs, Colo., October 1993, used a variety of texture analysis techniques in combination with a Cascade-Correlation neural network (an enhanced version of back-propagation) to classify homogenous regions. The data chosen by them for training and testing consisted of 8×8 pixel boxes containing only one vegetation type. Of the 14 vegetation types, only 9 were available in boxes of this size. The task was to train the neural network on half of these boxes and then attempt to identify vegetation types in the remaining boxes. Using this approach, they were able to achieve approximately 99% correct classifications.

Figure 6:
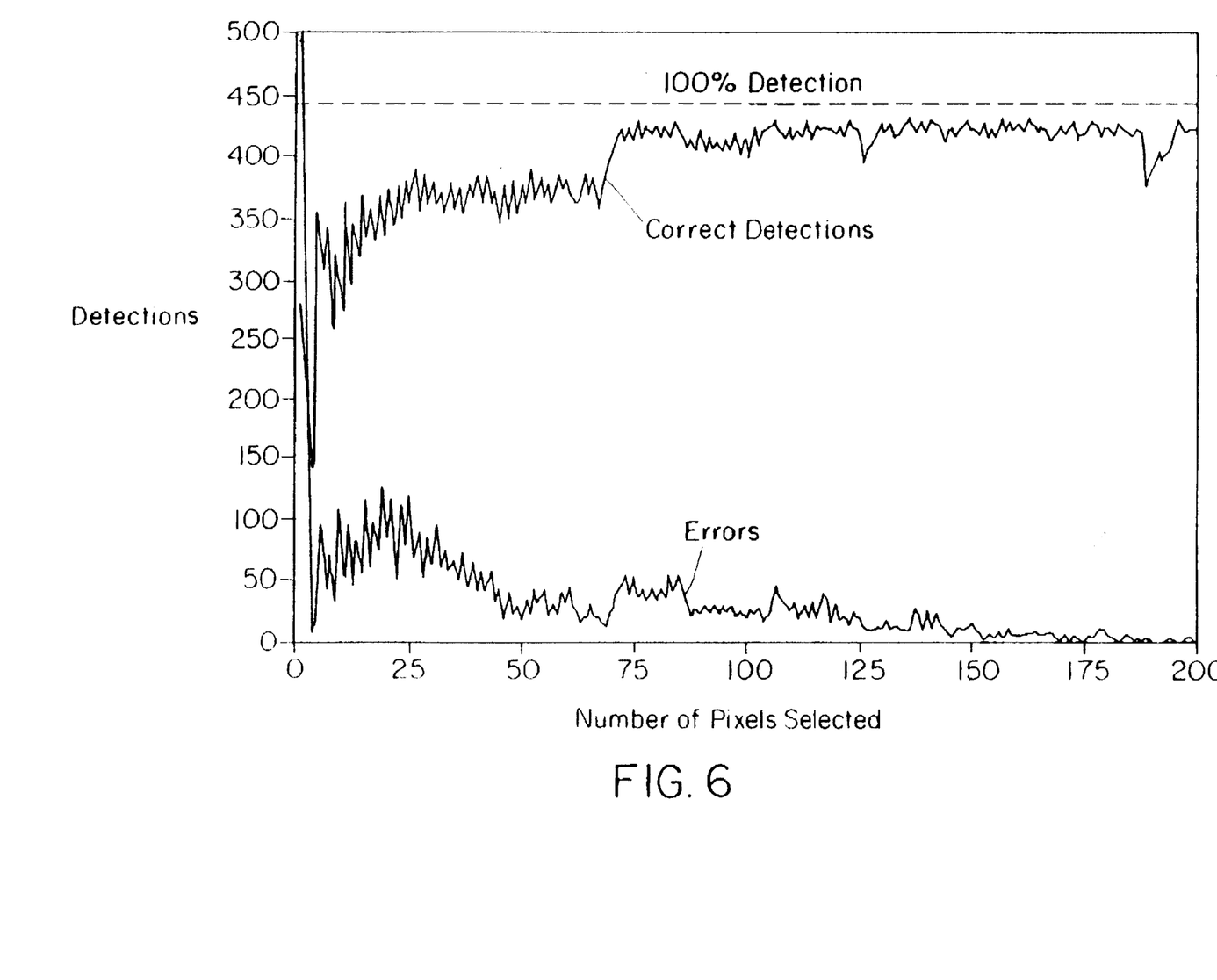
FIG. 6 is a graph of the number of correct detections and number of errors for a single agent (functional template) plotted for each successive input example or counter example.

Applicant has also used this same TM image to perform a preliminary evaluation of functional template learning. Using the truth image to guide training in a local area, applicant trained agents 22 to identify each of the vegetation types. Applicant used a 100×100 pixel image for training. Convergence to a solution was typically rapid. For example, FIG. 6 shows for one of the agents the number of correct detections and false alarms as each example or counter-example was added. Even after only 50 inputs, the agent 22 was correctly classifying 80% of all pixels having this vegetation type with fewer than 5% false alarms. The average classification accuracy for 13 trained agents (1 vegetation type was not present in the training image) was 94% correct detections with 6% false alarms. Applicant then tested these agents 22 on a neighboring 100×100 subimage, achieving in this case 86% correct detections and 13% false alarms.

These results are clearly better than those reported by Huber and Casler, even when they incorporated topographic data in addition to the 6 TM bands. It is more difficult to compare the present invention results with those presented by M. Augusteijn et al. Both studies used 6-band single-pixel TM data. However, where the present invention was attempting to classify every pixel, the previous study attempted to classify homogeneous 8×8 patches. Many, if not most, of the classification mistakes made by the present invention system were near the boundaries between regions. These boundaries are likely to have transitional spectral characteristics, which should be more ambiguous. By only considering large patches, the previous study avoided any attempt to classify these boundary zones.

In sum, databases will soon contain far more data than humans can peruse in any useful interval of time. Other limitations of course exist, such as communications bandwidth and computer resources, which will impose costs for each image retrieved. However, the data handling capabilities of computers and communications networks are increasing far more rapidly than humans will be able to evolve. Ultimately, the human limitations are the ones that will have to be addressed.

Applicant has designed a way for a user and a machine (computer) learning algorithm to collaborate in the training of an agent to recognize some particular spectral or textural pattern. Being provided with a set of examples of the intended pattern and counter-examples of patterns to be ignored, the learning algorithm attempts to create a model of the intended pattern. The trained agent is then sent into a large database to autonomously search for other images containing the same patterns. As mistakes are made, the user can continue to refine the agent by adding more examples and counter-examples.

Several content-based image retrieval systems already exist in which the user provides an example of what is wanted. However, in all previous systems the user can supply only a single example: there is no capability for learning from mistakes. In single example systems, a number of computed feature attributes are indiscriminately matched using a Euclidean distance metric against those computed for database images. However, not every attribute is discriminating. Unlike the various single example mechanisms, functional template learning of the present invention learns which attributes are consistently discriminating over a variety of examples.

An application that illustrates the advantages of learning from mistakes is that of prospecting. Suppose geologists find an unusual mineral deposit. Using hyperspectral image data, they might indicate the location of the deposit to the present invention. From the single example, the constructed agent creates an interest image highlighting the known deposit and any other locations having similar characteristics. The geologists might then visit some of these other locations, either confirming or denying the agent's assessment. As feedback is given in the form of new examples or counter-examples, the best discriminants are discovered.

Most learning algorithms are set up to be trained from a selection of inputs that are arbitrarily fixed in order of presentation prior to learning. Selection of a next input is unrelated to how well the discrimination task is learned. In contrast, the learning environment in the present invention promotes a more directed selection of inputs. The use of interest images as a means of visual feedback to the user allows the user to select those inputs that will most rapidly correct errors in discrimination. Consequently, if a solution is possible, convergence to a solution is rapid.

This collaborative approach to pattern learning incorporated in the present invention may alternatively be accomplished with other machine learning techniques. However, functional template learning has many advantages over other techniques that make it well suited to the present invention image searching environment. For example, neural networks have become the standard against which machine learning techniques are compared. They often achieve good classification performance and are adaptable to a wide variety of problems. However, neural networks tend to exhibit a number of awkward disadvantages that are not apparent with functional template learning.

Neural networks tend to require a large number of inputs before converging on a solution. As currently implemented in the present invention, functional template learning is capable of producing reasonably accurate agents in as little as 5 to 10 inputs.

It is difficult to uncover what attributes a neural network used to discriminate between classes. With functional template learning of the present invention, the ranking of weights and the appearance of scoring functions can be easily interpreted. These can be easily edited, producing predictable changes to performance.

The classification behavior of a trained neural network often varies with the order of presentation of training data. Because the weights and scoring functions of functional templates of the present invention are based on what values are currently in the example and counter-example sets, they will necessarily be the same regardless of order of input.

In search mode, trained neural networks are more computationally expensive than functional templates. Each neuron of a neural network receives an input from each neuron in the preceding level and sends an output to each neuron in the succeeding level. The combinatoric pattern of calculations is not present in functional template correlation of the present invention. Moreover, functional template correlation works using table lookups, which is much faster than the calculations that need to take place at each neuron of a neural network.

Moreover, it is important to note that the goal of the present invention is not necessarily to provide perfect discrimination; functional template learning does not have to be as good a classifier as neural networks to be useful in the context of database (image) searching. In a search for some particular event or feature, the present invention provides a prescreening service that reduces the number of images that users would need to download and look at themselves.

It is predicted that search apparatus of the present invention, which allows a user with limited computer experience to build useful computer vision tools, will encourage users to explore image databases. Among other things, users might:

cover more imagery than would previously been possible, given limitations in human endurance and attention.

discover better formulas for computing indices for such image features as vegetation and clouds.

discover relationships between regions or objects that have not been noticed before.

Such discoveries have always been possible. However, cost has been a limiting factor,since such exploration has typically been accomplished by customized programs developed by people with both computer and specific application expertise. With image search apparatus and method of the present invention, a larger community of users with application experience but limited computer experience can inexpensively do the explorations for themselves.

Equivalents

While the invention has been particularly shown and described with reference to a preferred embodiment thereof, it will be understood by those skilled in the art that various changes in form and details may be made therein without departing from the spirit and scope of the invention as defined by the appended claims.

For example, a primary goal is to provide a full working image searching apparatus, capable of interacting with a large database, such as the Data Archive and Analysis Centers (DAACs) being assembled under the EOSDIS project. This would include working out strategies for prescreening data using metadata. Other issues include the rules and handshaking that allow an agent to be exported to a DAAC supercomputer, compiled, started, and terminated.

A second goal is the extension of the machine learning techniques to shape. The current implementation of functional template learning is capable of learning patterns based on point characteristics such as spectrum, polarization, and textural transformations. However, functional template correlation was originally constructed as a shape matching tool. This means that the same functional template correlation engine that would be packaged as part of any agent 22 already has the capability for searching for shapes. What is missing is an interactive means for learning shapes, where the learning algorithm produces an interest image indicating locations of matches and a means for the user to indicate mistakes. However, in order to do this, there is needed a means of registering each example to a common reference frame. For example, if a particular shape varies in orientation, then each example of that shape would have to be rotated to a common orientation. Similarly, the centers and scaling of each instance of a shape would have to be registered.

We have long been using interest as a "common denominator" for data fusion in detection tasks. Any two interest images can be combined using simple rules of pixel-level arithmetic or fuzzy logic. Using this technique, applicant has constructed computer vision systems with complicated rules of behavior from simple functional templates. Similarly, agents (functional templates) learned in the present invention environment might be assembled into more complicated algorithms. One simple example is using a set of agents, each with a different resolution. A coarse resolution agent, presumably faster but more prone to errors than a fine resolution agent, might be used to prescreen a large set of data. Those images selected by the coarse resolution agent would then be searched by the fine resolution agent. Another way of combining the outputs of agents is to collect the outputs of several agents, each looking for some different feature of a region or object. A weighted average of these interest images might better highlight the locations of some region or object than any individual interest image. Functional templates can also take other interest images as input, allowing for sequential processing. For example, the interest image shown in FIG. 5 might be improved by applying a circular mean filter, which would tend to suppress any isolated high interest values and raise any isolated low interest values.

Another area of equivalence is the use of principal component analysis (PCA) and related techniques to explore the assembled sets of example and counter-example values. The motivation of PCA is to find ways of mathematically combining groups of attributes into a new single attribute that is a better class discriminant than any of the original, individual attributes. A ratio is one simple example of how two attributes can be combined mathematically into a single attribute. Such new attributes could then be considered in addition to the original attributes used for functional template learning. If these new attributes prove to be better discriminants, then their weights will be higher and tend to dominate the characteristics of the agent.

Further, as used herein, the term "agent" refers to an executable computer program, module or procedure/routine for performing a defined task. Other similar computer entities implemented in software, hardware or a combination thereof are suitable.

What is claimed is:

1. Computer image searching apparatus for obtaining a desired image from a multiplicity of images, comprising:

input means for setting forth a user-desired image subject to be recognized, the image subject being formed of a plurality of attributes;

processor means coupled to the input means for determining from the plurality of attributes a subset of most discriminating attributes, the processor means including:

a histogram member coupled to the input means for generating a pair of histograms for each attribute, the pair including a first histogram based on user-input examples of the attribute and a second histogram based on user-input counter examples of the attribute;

processing means coupled to the histogram member for generating for each attribute, a weight and a scoring function from the pair of histograms generated for the attribute; and a sorter for selecting scoring functions according to highest weight, the attributes corresponding to said selected scoring functions forming the subset of most discriminating attributes;

a functional template member coupled to the processor means for providing a functional template based on scoring functions for each discriminating attribute in the subset; and an agent coupled to the functional template member to receive the functional template therefrom, the agent employing the functional template in a matching routine to extract images from the multiplicity of images, the extracted images having the desired image subject.

2. Computer image searching apparatus as claimed in claim 1 wherein for each attribute, the processing means calculates the weight as a function of degree of overlap between the first and second histograms in the pair of histograms for the attribute.

3. Computer image searching method for obtaining a desired image from a multiplicity of images, comprising the steps of:

(a) providing a user-desired image subject to be recognized, the image subject being formed of a plurality of attributes;

(b) using processor means, determining from the plurality of attributes, a subset of most discriminating attributes by:

generating for each attribute a pair of histograms, the pair including a first histogram based on user input examples of the attribute and a second histogram based on user input counter examples of the attributes;

generating weights and scoring functions of the attributes based on the histograms, including utilizing the pair of histograms generated for the attribute; and selecting scoring functions according to highest weight, the attributes corresponding to said selected scoring functions forming the subset of most discriminating attributes;

(c) generating a functional template based on scoring functions for each discriminating attribute in the subset; and (d) using the functional template, matching a model of the desired image subject to images in the multiplicity of images, to extract those images having the desired image subject.

4. Computer image searching method as claimed in claim 3 wherein the step of generating weights and scoring functions of the attributes includes calculating the weight as a function of degree of overlap between the first and second histograms in the pair of histograms for each attribute.

5. Computer image searching apparatus for obtaining a desired image from a multiplicity of images, comprising:

input means for setting forth a user-desired image subject to be recognized, the image subject being formed of a plurality of attributes;

processor means coupled to the input means for determining from the plurality of attributes a subset of most discriminating attributes, the processor means including:

a histogram member coupled to the input means for generating a histogram for each attribute;

processing means coupled to the histogram member for generating weights and scoring functions for the attributes; and a sorter for selecting scoring functions according to highest weight, the attributes corresponding to said selected scoring functions forming the subset of most discriminating attributes; wherein the processing means and sorter are coupled such that the processing means generates weights for each attribute, then the sorter selects attributes with the highest weights, and the processing means generates scoring functions for the selected attributes;

a functional template member coupled to the processor means for providing a functional template based on scoring functions for each discriminating attribute in the subset; and an agent coupled to the functional template member to receive the functional template therefrom, the agent employing the functional template in a matching routine to extract images from the multiplicity of images, the extracted images having the desired image subject.

6. Computer image searching method for obtaining a desired image from a multiplicity of images, comprising the steps of:

(a) providing a user-desired image subject to be recognized, the image subject being formed of a plurality of attributes;

(b) using processor means, determining from the plurality of attributes, a subset of most discriminating attributes by:

generating for each attribute a histogram;

based on the histograms, generating weights for each attribute;

selecting attributes with the highest weights;

generating scoring functions for only the selected attributes; and selecting scoring functions according to highest weight, the attributes corresponding to said selected scoring functions forming the subset of most discriminating attributes;

(c) generating a functional template based on scoring functions for each discriminating attribute in the subset; and (d) using the functional template, matching a model of the desired image subject to images in the multiplicity of images, to extract those images having the desired image subject.

* * * * *